United States Patent
Herges et al.

(10) Patent No.: US 10,003,864 B2
(45) Date of Patent: Jun. 19, 2018

(54) DEVICE FOR TRANSMITTING AND RECEIVING A SENSOR SIGNAL

(71) Applicant: KNORR-BREMSE SYSTEME FUER NUTZFAHRZEUGE GMBH, Munich (DE)

(72) Inventors: Michael Herges, Munich (DE); Johannes Kleppe, Munich (DE); Dieter Woerner, Eppingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days. days.

(21) Appl. No.: 15/516,232

(22) PCT Filed: Sep. 22, 2015

(86) PCT No.: PCT/EP2015/071697
§ 371 (c)(1),
(2) Date: Mar. 31, 2017

(87) PCT Pub. No.: WO2016/050558
PCT Pub. Date: Apr. 7, 2016

(65) Prior Publication Data
US 2017/0303015 A1    Oct. 19, 2017

(30) Foreign Application Priority Data
Oct. 1, 2014    (DE) .................. 10 2014 114 316

(51) Int. Cl.
*G08C 19/22*     (2006.01)
*H04Q 9/00*      (2006.01)
(Continued)

(52) U.S. Cl.
CPC ............. *H04Q 9/00* (2013.01); *B60R 16/023* (2013.01); *G08C 25/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,260,877 A | * | 11/1993 | Drobny | F02D 11/107 123/479 |
| 2004/0081079 A1 | * | 4/2004 | Forest | H03M 13/43 370/216 |

(Continued)

FOREIGN PATENT DOCUMENTS

| | | |
|---|---|---|
| DE | 20121466 U1 | 2/2003 |
| DE | 10337045 A1 | 3/2005 |

(Continued)

OTHER PUBLICATIONS

International Search Report dated Dec. 7, 2015, of the corresponding International Application PCT/EP2015/071697 filed Sep. 22, 2015.

(Continued)

*Primary Examiner* — Brian Zimmerman
(74) *Attorney, Agent, or Firm* — Gerard Messina (57) ABSTRACT

A transmission device for transmitting a sensor signal relating to a physical variable, including: an input interface for inputting the sensor signal; a signal generator for generating a comparison signal; a data processing unit to combine the sensor signal and the comparison signal to form a modified sensor signal; and an output interface which can be coupled to a signal path to output the modified sensor signal, in which the comparison signal changes over time in a predetermined manner over a range of values, so as to permit a receiver to detect an erroneous sensor signal or an erroneous transmission using the transmitted comparison signal. Also described are a related receiver, a related system, a related vehicle, a related method, and a related computer program.

19 Claims, 4 Drawing Sheets

(51) Int. Cl.
B60R 16/023 (2006.01)
G08C 25/00 (2006.01)

(56) References Cited

U.S. PATENT DOCUMENTS

| | | | | |
|---|---|---|---|---|
| 2005/0038623 A1* | 2/2005 | Hammerschmidt | ..... | G01D 3/08 |
| | | | | 702/118 |
| 2007/0135983 A1* | 6/2007 | McDonald | .............. | B60R 21/01 |
| | | | | 701/45 |
| 2013/0198428 A1* | 8/2013 | Kreuzer | .................. | G06F 13/36 |
| | | | | 710/110 |

FOREIGN PATENT DOCUMENTS

| | | |
|---|---|---|
| DE | 102011052095 A1 | 1/2013 |
| EP | 0446453 A1 | 9/1991 |

OTHER PUBLICATIONS

Traverse et al., IFIP/WCC/Toulouse "Airbus Fly-By-Wire a Total Approach to Dependability," Aug. 2004.

\* cited by examiner

DEVICE FOR TRANSMITTING AND RECEIVING A SENSOR SIGNAL

FIELD OF THE INVENTION

The present invention relates to a transmission device and a receiving device for transmitting and receiving a sensor signal and in particular to devices and a method which guarantee checking of transmission of sensor signals, in particular for critical applications in vehicles.

BACKGROUND INFORMATION

More and more functions in vehicles are controlled and supervised electronically. Increasingly, control also components of the vehicle relating to safety, where error behavior cannot be tolerated. For example, this relates to detecting pedal positions, such as for example the brake pedal, or a steering wheel in a vehicle, where high demands are placed on electronic controls.

In particular it must be guaranteed that the measured values: (i) are not falsified and (ii) are up-to-date. In the case of an error at any point in the measuring chain it is important that this error is recognized, securely and quickly.

In order to offer a high degree of security, in spite of this, conventional signal detection and transmission devices have a redundancy by having two lots of components present, with the result that when one of the components malfunctions, the corresponding physical variable is still securely and reliably detected and processed. The conventional solutions measure the physical variable over two completely different signal paths, including duplicated microcontrollers, in order to recognize errors in one of the signal paths by analyzing the plausibility of the two signals.

However, this approach has the disadvantage that, by duplicating the existing components, the outlay is high, and additionally more space is required to house the duplicated components.

SUMMARY OF THE INVENTION

Therefore, an object of the present invention is providing an alternative which, on the one hand, makes possible a secure recording of a physical variable, such as for example a pedal position, but on the other hand also securely detects an error behavior or a drop out of a part of the signal processing and signal transmission, and thus provides the same degree of security as redundant systems.

The aforementioned object is achieved by a transmission device according to the description herein, a receiving device according to the description herein and a method according to the description herein. The further descriptions herein relate to advantageous developments of the subject matter of the main descriptions herein.

The present invention relates to a transmission device for transmitting a sensor signal relating to a physical variable.

The transmission device comprises the following features: an input interface for inputting the sensor signal; a signal generator for generating a comparison signal; a data processing unit and an output interface. The data processing unit is configured to combine the sensor signal and the comparison signal to form a modified sensor signal. The output interface can be coupled to a signal path to output the modified sensor signal. The comparison signal changes over time in a predetermined manner over a range of values, in order to permit a receiver to detect an erroneous sensor signal or an erroneous transmission by using the transmitted comparison signal.

The present invention is thus based on the fact that not only is (at least) one sensor signal transmitted but that a comparison signal is transmitted together with the (at least) one sensor signal, wherein the comparison signal has a predetermined form which can be used to detect errors. If the predetermined form of the comparison signal is transmitted correctly, the conclusion can be drawn that the transmission path and the data processing for the (at least) one sensor signal is operating without errors. For example, the comparison signal can be combined with the sensor signal, indeed even before a possible digitization and data processing begins, with the result that both signals are subjected to the same processing, with potential errors becoming recognizable via the comparison signal.

Within the scope of the present invention, a sensor signal is to be interpreted broadly. It can refer to all continuous or digital or discrete signals and need not necessarily be a constant or time-limited signal. In fact, it can have any signal sequence. Discrete signals can for example occur as a result of scanning of a continuous physical variable. Generally, a sensor signal is understood to mean a function of time and relates not only to a specific point in time, but also has a general variation in time.

Likewise, the comparison signal is understood to mean any signal which has a predetermined form. For example, the predetermined form can be achieved by a specific function, such as for example a sine curve or a sawtooth curve, or be defined by another predetermined function. The comparison signal is thus also not understood to mean that it just transmits information relating to a specific point in time, but can have a variation in time which changes over time in a predetermined manner. In order to serve as a test signal, the comparison signal should be predictable and should not correlate to respective sensor values, i.e. it should be independent of the specific sensor values which depend on an actuation of the user. However, as described further below, the range of values and a possible period can depend on the sensor signals to be expected.

Combining can refer to any bringing together of signals. For example, combining includes a multiplex relating to the time, phase or code or even a modulation of the signals. Combining is understood always to mean that it includes any joining together of signals, with the result that the signals do not interfere with one another, as is possible due to conventional multiplex methods.

The modified signal is intended to mean that there should be any modification of the sensor signal and/or of the comparison signal. Instead, these signals can be combined to form a data stream which corresponds to the signal. This can be done by time multiplexing, with the result that each signal is assigned a slot in which it is transmitted.

Optionally, in further embodiments, depending on the physical variable, the sensor signal takes values in a sensor range and the signal generator is configured to generate the comparison signal such that the range of values includes the sensor range.

As a result it is guaranteed that the signals are processed accurately and correctly over the whole bandwidth of the sensor variables to be transmitted.

Optionally, further embodiments include an analog-digital converter which is configured to convert the sensor signal and the comparison signal into a digital signal in the same way. The digital signal can optionally be further processed before being output by the output interface which is a digital interface.

Optionally, in further embodiments, the signal generator is configured to generate the comparison signal periodically over time with a predetermined period. The sampling rate of the analog-digital converter and/or the period can be chosen such that successive samplings of the comparison signal differ by not more than a predetermined number of digitization steps.

For example, the predetermined number can be 10, 5, 3 or 1. This enables possibly all or possibly many digitization steps to be able to be checked by the comparison signal.

In order to guarantee this as efficiently as possible, the data processing unit is optionally configured to control the period of the comparison signal via a control signal.

Optionally, further embodiments include a multiplexer (a combiner), wherein the multiplexer is configured to combine the sensor signal and the comparison signal and to emit them to the analog-digital converter.

The multiplexer is for example a time multiplexer which guides the sensor signal and the comparison signal into the data stream at different times. The analog-digital converter can write the digitized sensor signal and the digitized comparison signal in different registers using the switching frequency of the multiplexer after digitization, with the result that the digitized sensor signal and the digitized comparison signal can be further processed. Ultimately, the processed digital signals can be brought back together (e.g. by multiplexing again) and transmitted to the receiver via the signal path, for which for example a CAN (controller area network) bus can be used. The multiplexing methods used can be the same, but do not need to be. In every case, it should be possible to separate the original signals clearly from the signal stream which arrives at the receiver.

Optionally, in further embodiments, the sensor signal includes a first sensor signal and a second sensor signal, both of which record the physical variable and which are both contradirectional. It is thus achieved that a change in physical variable leads to opposite effects on the first sensor signal and on the second sensor signal. The data processing unit can process the first sensor signal and the second sensor signal and the comparison signal and combine them to form the modified sensor signal. In order to do this, the processing unit can optionally have a further multiplexer.

By transmitting two sensor signals to two sensors it is guaranteed that the sensor recording has proceeded correctly.

In particular, contrary sensor recording leads to a contrary result (e.g. at the receiver). This can be tested and, if this is not the case, it can be concluded that one of the two sensors has an error (the one which does not supply a contrary result) or there is a short circuit.

Optionally, in further embodiments, the first sensor signal accepts values in a first sensor range and the second sensor signal takes values in a second sensor range. The first sensor range and the second sensor range can for example be chosen such that one or any averaging of values of the first sensor range with values of the second sensor range leads to average values which lie outside the first sensor range and outside the second sensor range. Such a value can be established as being invalid as it lies outside a valid range. Therefore, the data processing unit can be configured to detect such average values as invalid sensor values and to output an error.

The average values can for example be generated by short circuiting the first sensor signal with the second sensor signal. In such a case, both sensor paths would be connected to each other (with the result that, for example, the voltage levels equal an average value) or are jointly connected to ground.

Optionally, further embodiments include a feedback from the data processing unit to an input of the first sensor signal and the second sensor signal in order to change either the first sensor signal or the second sensor signal by a predetermined value. The data processing unit is optionally configured to ascertain an error if both sensor signals change in response to the change of one of the two sensor signals.

For example, if there were to be a short circuit (e.g. if both sensor signals are at the same voltage), the change in the one sensor signal will lead to the second signal also changing in the same way (or will have no influence if both signals are connected to ground).

Optionally, it is likewise possible to change both signals via the feedback, but in different ways, with the result that the data processing unit expects a specific change and if this is missing, can establish an error.

Optionally, in further embodiments the data processing unit is configured to process the first sensor signal with a first algorithm and process the second sensor signal with a second algorithm and process the comparison signal with a third algorithm. The first algorithm and the second algorithm and the third algorithm can be the same. It is likewise possible that the first and third algorithm are the same and the second algorithm is different. If the first to third algorithms are the same, for example the second algorithm can have a different machine code from the first and the third algorithm (which can have the same machine code). It is likewise possible that the algorithm for the second sensor signal is the same as the algorithm for the first sensor signal and is the same as the algorithm for the comparison signal, but is implemented differently.

The different algorithms can for example be achieved in that, on the one hand, a calculation is carried out by a function and, on the other hand, a calculation is carried out via a look-up table. A further possibility for a use of different algorithms is in the use of different functions. With this, it is possible that, in addition to hardware errors in the data processing unit, errors in the compiler or in programming can likewise be recognized.

Optionally, in further embodiments the data processing unit is further configured to generate a message counter and/or a checksum and to add them to the modified sensor signal. The message counter and the checksum can be configured to detect and/or to locate an error during transmission on the signal path (e.g. in the data stream).

Optionally, in further embodiments the data processing unit is configured to carry out an offset correction and/or a linearization and/or a calibration of the sensor signal. The calibration data can be stored at least once. A calibration relates for example to a conversion of the physical measured variable (e.g. range/degree of an actuation of a pedal) into electrical signals (e.g. voltage levels). The offset relates for example to a variation in start and end values. For example, the range of values of the physical variable can be shifted into the electrical signal (starting values are not mutually mapped).

In further embodiments, the data processing unit can couple to a first time base and has a monitoring unit which can be coupled to a second time base. The monitoring unit is for example configured to ascertain an error as a result of an erroneous time base, for which reason the second time base can be used. Optionally, a corresponding error message is to be output.

Optionally, in further embodiments a transmission device is configured to receive the first sensor signal from a first sensor and the second sensor signal from a second sensor, wherein the first sensor and the second sensor detect a state of a vehicle component (e.g. position of an actuator such as for example a pedal).

The present invention also relates to a receiving device for receiving a modified sensor signal from the previously described transmission device. The receiving device includes the following features: an input interface, a recording unit (extraction device) for recording (extracting) a comparison signal, an evaluation unit for evaluating the comparison signal and an error detector. The input interface can be coupled to the signal path to receive the modified sensor signal. The evaluation unit has access to information about a valid comparison signal to ascertain an invalidity of the comparison signal on the basis of a comparison of the information with the detected recorded signal. The error detector is configured to detect an error if the comparison signal is invalid.

For example, the detection unit comprises a demultiplexer which deconstructs the modified sensor signal into its constituents, wherein the constituents can comprise all components which have been combined by the transmission device.

Optionally, in further embodiments the receiving device includes a device for requesting calibration values, wherein the calibration values can be requested from the transmission device or a memory. The calibration data can be used to ascertain a value of the physical variable from the sensor signal.

In further embodiments, the detection unit is configured to extract the checksum and/or the message counter from the modified sensor signal. The evaluation unit is optionally configured to establish interference on the signal path from variations in the checksum and to ascertain erroneous sections in the modified sensor signal, for example by the message counter.

Optionally, in further embodiments the evaluation unit is configured to receive and store a form of the valid comparison signal from the transmission device.

In further embodiments, the first sensor signal 105a and the second sensor signal 105b can optionally be aggregated in the receiving device to eliminate a common mode error. In particular, if both sensor signals 105 are contradirectional, a common mode error can be ruled out very efficiently herewith.

The present invention likewise relates to a system having a transmission device as described above, a receiving device as described above and a signal path which connects the transmission device to the receiving device.

Further embodiments likewise relate to a vehicle with the named system for transmitting a position of an actuator securely to an electronic control unit (ECU).

The present invention relates likewise to a method for transmitting, securely, a sensor signal relating to a physical variable. The process includes the following steps: generating a comparison signal which changes over time in a predetermined manner over a range of values; combining the sensor signal and the comparison signal to form a modified sensor signal; transmitting the modified sensor signal over a signal path; receiving the modified sensor signal by a receiver; extracting the comparison signal from the modified sensor signal; comparing the recorded comparison signal with information about a valid comparison signal to ascertain an invalidity of the extracted comparison signal on the basis of the comparison of the information with the recorded comparison signal; and ascertaining an error in the transmission of the sensor signal if the comparison signal is invalid.

This method can likewise be implemented or stored in software or on a computer program product in the form of instructions, wherein stored instructions are capable of executing the steps according to the method if the method runs on a processor.

Thus, embodiments of the present invention offer the advantage that it is not necessary to duplicate all components, but that a secure and reliable data transmission of the two sensor variables can take place using the two existing sensors, and that it is possible to establish an error behavior immediately.

The invention thus provides a cost-effective sensor unit for measuring a physical variable for a control apparatus/actuator which makes possible a secure "fail silent" behavior (i.e. in the event of a failure nothing is emitted, and there can be no malfunction).

The embodiments of the present invention are better understood with reference to the following detailed description and the attached drawings of the different embodiments which, however, should not be understood as limiting the disclosure to the specific embodiments, but merely serve to aid explanation and comprehension.

DETAILED DESCRIPTION

Figure 1:
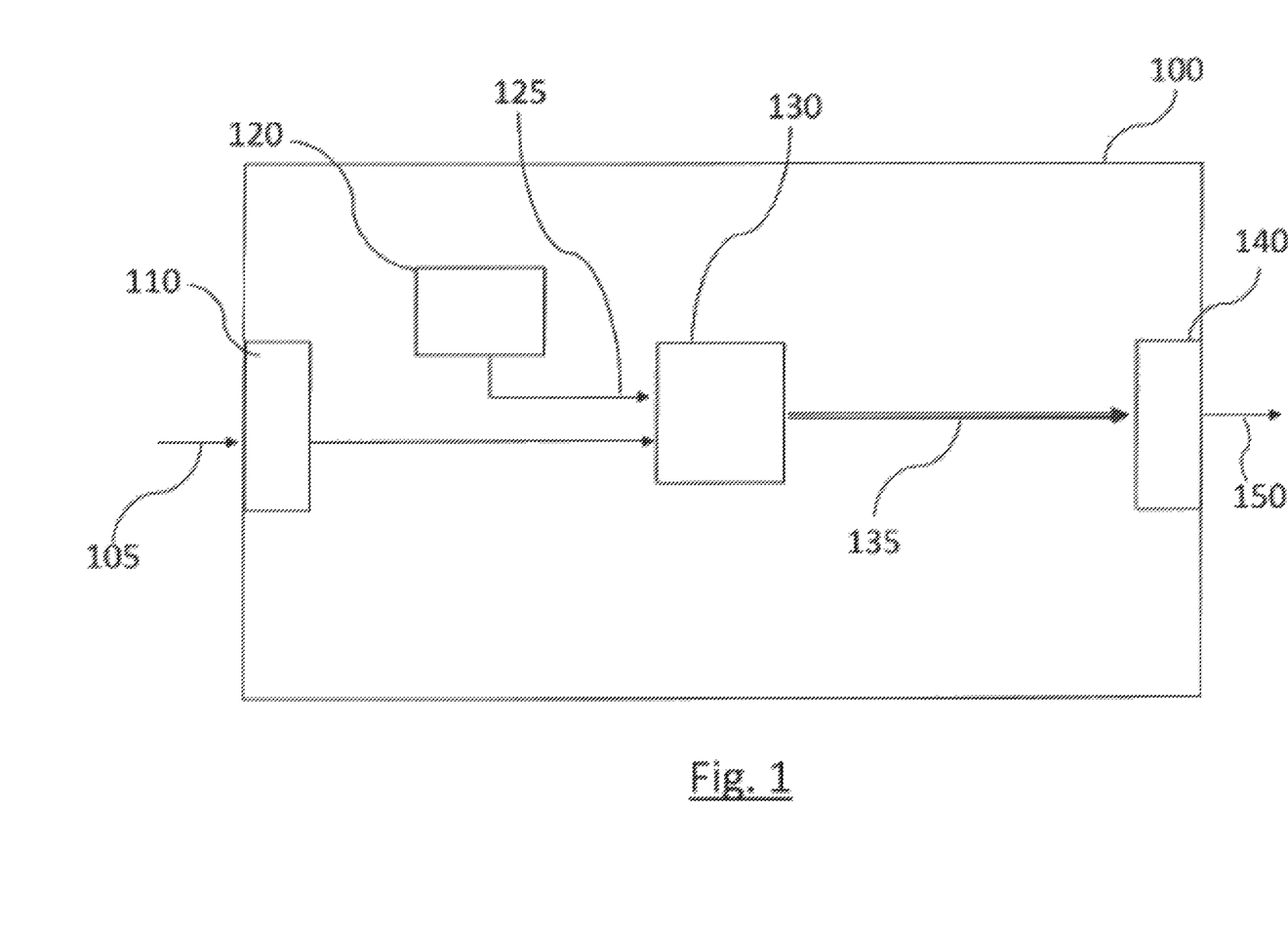
FIG. 1 shows an embodiment of a transmission device.

FIG. 1 shows an embodiment of the present invention for a transmission device 100 for transmitting a sensor signal 105 to a physical variable which is detected by a sensor (not shown). The transmission device 100 includes the following features: an input interface 110 for receiving the sensor signal 105, a signal generator 120 for generating a comparison signal 125, a data processing unit 130 and an output interface 140. The data processing unit 130 is configured to process the sensor signal 105 and the comparison signal 125 and to combine them to form a modified sensor signal 135 (e.g. via a multiplexer). The output interface 140 can be coupled to a signal path 150 to output the modified sensor signal 135 on the signal path 150. The comparison signal 125 changes over time in a predetermined manner over a range of values, in order to permit a receiver (receiving device) to detect an erroneous sensor signal or an erroneous transmission by the comparison signal 125.

In order to do this, the transmission device 100 can supply information about the comparison signal 125 to the receiver or obtain a desired comparison signal 125 from the receiver, with the result that, after extracting the comparison signal 125, the receiver can compare the obtained comparison signal with the information and can detect an error on this basis.

Figure 2:
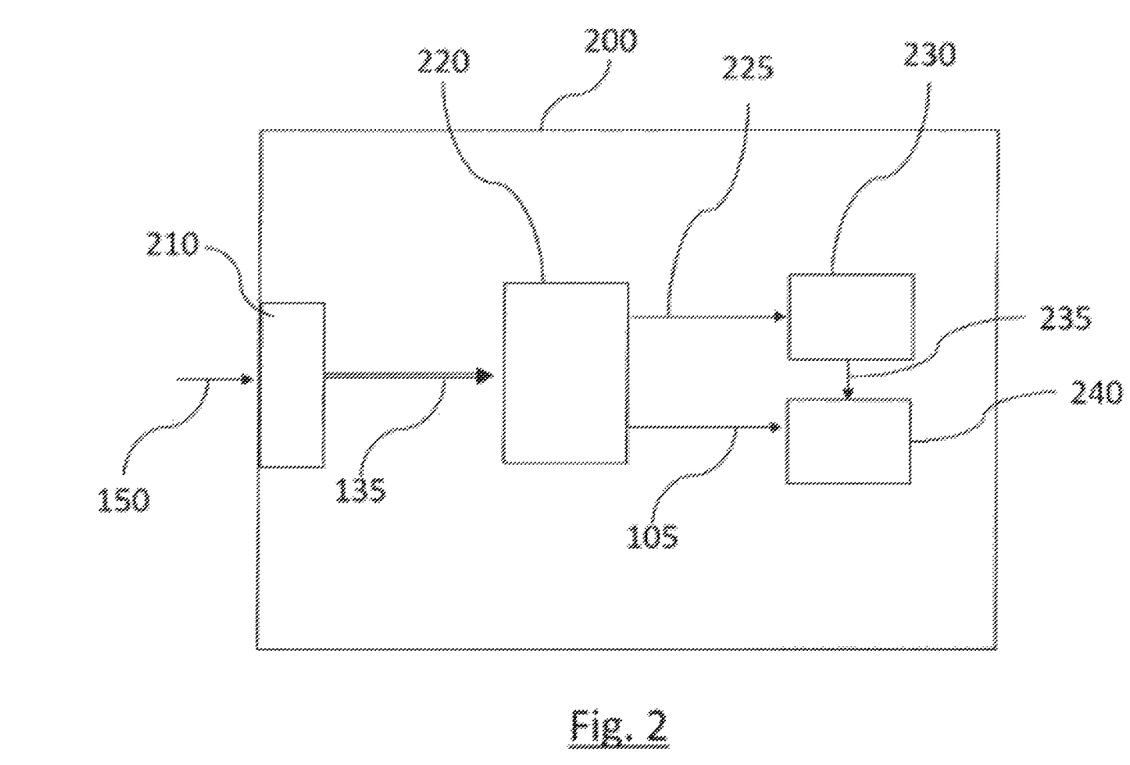
FIG. 2 shows an embodiment of a receiving device.

FIG. 2 shows an embodiment of the present invention for a receiving device 200 for receiving the modified sensor signal 135 from the transmission device 100. The receiving device 200 includes the following features: an input interface 210, a recording unit 220 for detecting a comparison signal 225, an evaluation unit 230 for evaluating the recorded comparison signal 225 and an error detector 240. The input interface 210 couples to the signal path 150 to receive the modified sensor signal 135. The evaluation unit 230 has access to information about a valid comparison signal 125 to establish an invalidity of the recorded comparison signal 225 on the basis of the comparison of information about the recorded comparison signal 225. The error detector 240 is configured to establish an error in the transmission of the sensor signal 105 if the recorded comparison signal 225 is invalid.

For example, the receiving device 200 can have a memory which stores information about the valid comparison signal 125. This information can for example include the functional progress, the period, rises and similar information which makes possible a verification of the comparison signal.

Figure 3:
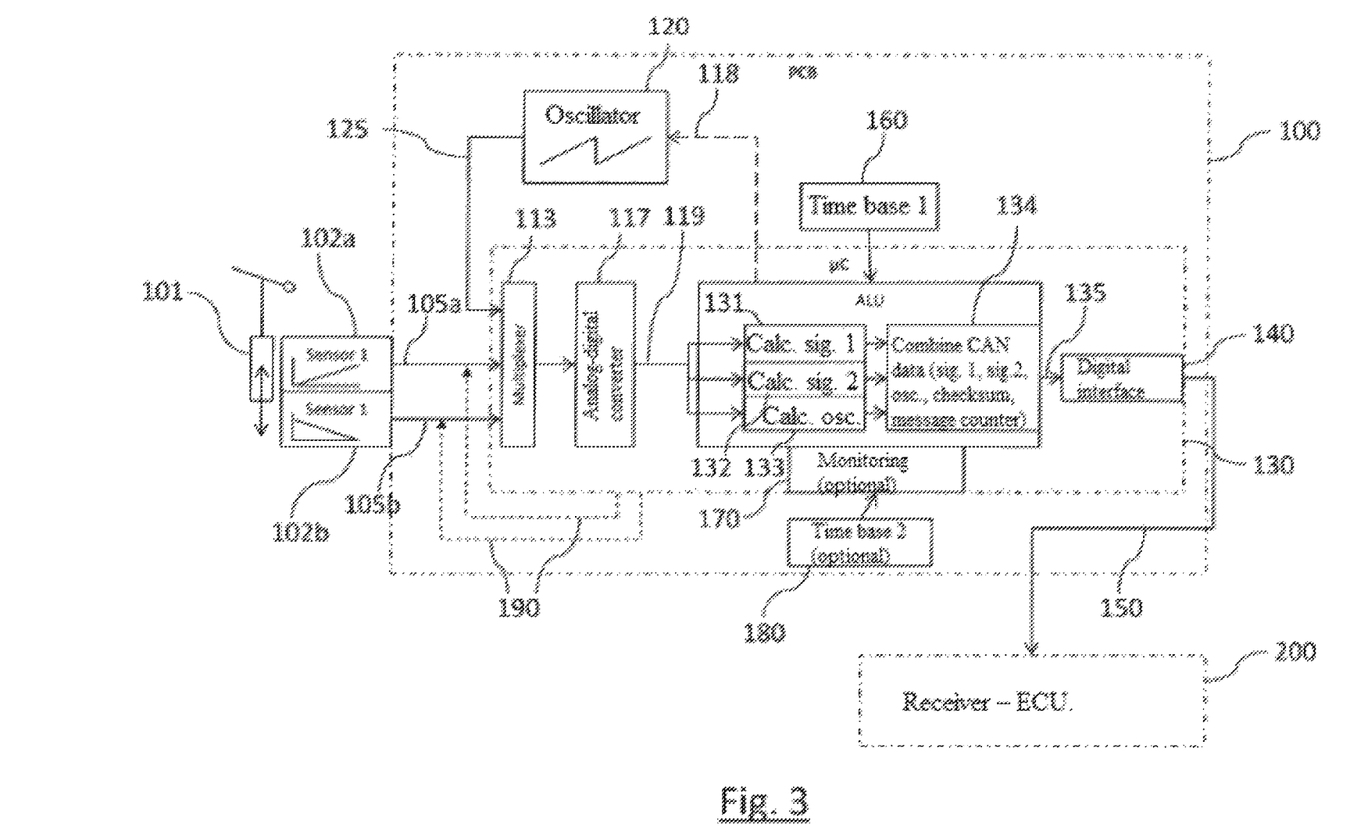
FIG. 3 shows further optional components of the transmission device according to further embodiments.

FIG. 3 shows a system having a transmission device 100 and a receiving device 200 which are connected to one another with a signal path 150, wherein the transmission device 100 has further optional components. The transmission device 100 can for example be configured on a printed circuit board (PCB).

The transmission device 100 couples to a first sensor 102a and a second sensor 102b, which both record a sensor variable in respect of an actuator 101. The actuator 101 can for example be a pedal, the actuation or linear movement of which is intended to be established. The first sensor 102a records the actuator variable by a first signal 105a which is recorded by the transmission device 100. The second sensor 102b (or further sensor) records the same actuator variable and emits a second sensor signal 105b to the transmission device 100. In the embodiment of FIG. 3, the sensor variables 105a, 105b of the first sensor 102a and of the second sensor 102b are contradirectional. This means that a stronger actuation of the exemplary pedal 101 in the first sensor variable 105a leads for example to an increase of the sensor signal, and in the meantime the same actuation of the pedal 101 in the second sensor 102b leads to a smaller sensor signal.

In further embodiments, the first sensor 102a and the second sensor 102b are configured to generate a range of values for each of the first sensor signal 105a and the second sensor signal 105b which do not mutually overlap. For example, the two ranges of values can be selected such that an average of the sensor values of the first sensor signal 105a and of the second sensor signal 105b lies outside the two ranges of values. For example, the first range of values can extend from 4 to 6 volts and the second range of values can extend between 10 and 12 volts. Such a choice offers the advantage that a short-circuit of both sensor signals would lead to a voltage level which lies in the range between 7 and 9 volts. As this range lies outside the two ranges of values (between 4 . . . 6 V and 10 . . . 12 V), the appearance of such a sensor signal clearly indicates an error. It is self-evident that the named voltage values serve merely as an illustration and are not interpreted as being limitative. In fact, in other embodiments, these values can be selected to be different.

The transmission device 100 has a data processing unit 130 (with a multiplexer 113, an analog-digital converter 117 and an optional monitoring unit 170), a signal generator 120, a first time base device 160, an optional second time base device 180 and a digital interface 140.

The signal generator 120 is configured to generate the comparison signal 125, wherein the signal generator 120 can be controlled by the data processing unit 130 optionally via a control signal 118. For example, the signal generator 120 is configured to generate a periodic comparison signal 125 (for example in the form of a sawtooth pattern or a harmonic oscillation). The exemplary periodic signal has for example an amplitude which contains a range of values of the first and/or second sensor signal 105a, 105b. This offers the advantage that the comparison signal can check all gauge readings of the sensor signals 105. The rate of change of the periodic comparison signal for a predetermined amplitude can be set over the period. Advantageously, the period of the comparison signal 125 is chosen such that potentially all digital sampling values are checked at a given sampling frequency (e.g. due to the comparison signal 125 changing by not more than a quantization amount during digitization from one sampling to the next). A change in the comparison signal 125 is thus advantageously adapted to a digital sampling.

The control signal 118 can correspondingly control the signal generator 120 by the data processing unit 130, i.e. the amplitude and the period of the comparison signal 125 can be chosen accordingly by the data processing unit 130. However, they should not change dynamically with the sensor signal 105, but be predetermined.

The comparison signal 125 is entered into the multiplexer 113 together with the first sensor signal 105a and the second sensor signal 105b. The multiplexer is configured to combine the comparison signal 125 from the signal generator 120, the first sensor signal 105a and the second sensor signal 105b with one another and relay them to the analog-digital converter 117. The analog-digital converter 117 is configured to convert the combined signal of the multiplexer 113 into a digital signal 119 and to transmit them to a further data processing. The data processing processes the digitized signal 119 into a modified sensor signal 135 and emits this to the digital interface 140. The digital interface 140 couples to the signal path 150 which connects the transmission device 100 to the receiving device 200, with the result that the modified sensor signal 135 is received by the receiving device 200.

The first time base device 160 (e.g. a real-time clock or impulse generator) can provide a time signal to the data processing unit 130. Furthermore, the transmission device 100 optionally includes the monitoring device 170 which provides a monitoring of the processing by the data processing device 130. The monitoring device 170 is for example configured to detect possible errors in data processing and to send a signal. Moreover, the second time base device 180 is optionally provided in the transmission device 100 which provides a second time signal for the monitoring device 170, with the result that an error can be recognized in the time base device 160.

In the embodiment of FIG. 3, the data processing unit 130 is configured to process the first sensor signal 105a by a first algorithm 131 (e.g. in a first calculation unit). Moreover, the data processing unit 130 includes a second calculation unit for processing the second sensor signal 105b by a second algorithm 132 and a third calculation unit for processing the comparison signal 125 by a third algorithm 133.

The algorithms include for example a conversion of the digitized physical value, which for example corresponds to a path of a pedal, into corresponding digital data which are transmitted. Moreover, the algorithms can additionally carry out an offset correction, a linearization (e.g. mapping the linear distances on a linear signal level) or a calibration with calibration data.

Moreover, the data processing unit 130 comprises a combiner 134, which, after calculation/processing by the first to third calculation units 131, 132, 133, is configured to combine the obtained results. The combiner 134 can optionally add a checksum and a message counter to the combined result. The checksum is for example configured to provide an authenticity of the signals or signal values, whereas the message counter counts the individual messages to make possible an establishing of missing or erroneous messages as a result. In particular, the error can thus be located.

Optionally, a feedback 190 from the data processing unit 130 to the first sensor signal 105a and the second sensor signal 105b is configured. One of the two sensor signals can be changed, in targeted manner via this feedback, with the result that a conclusion can be drawn, on the basis of the change which has taken place, as to whether the two sensor signals are valid sensors after the analog-digital converter or not. For example, a targeted change of only one of the two sensor signals 105 can detect whether there is a short-circuit between the two sensor signals 105, as a short-circuit would inevitably lead to both sensor signals 105 changing, even if only one is varied.

Figure 4:
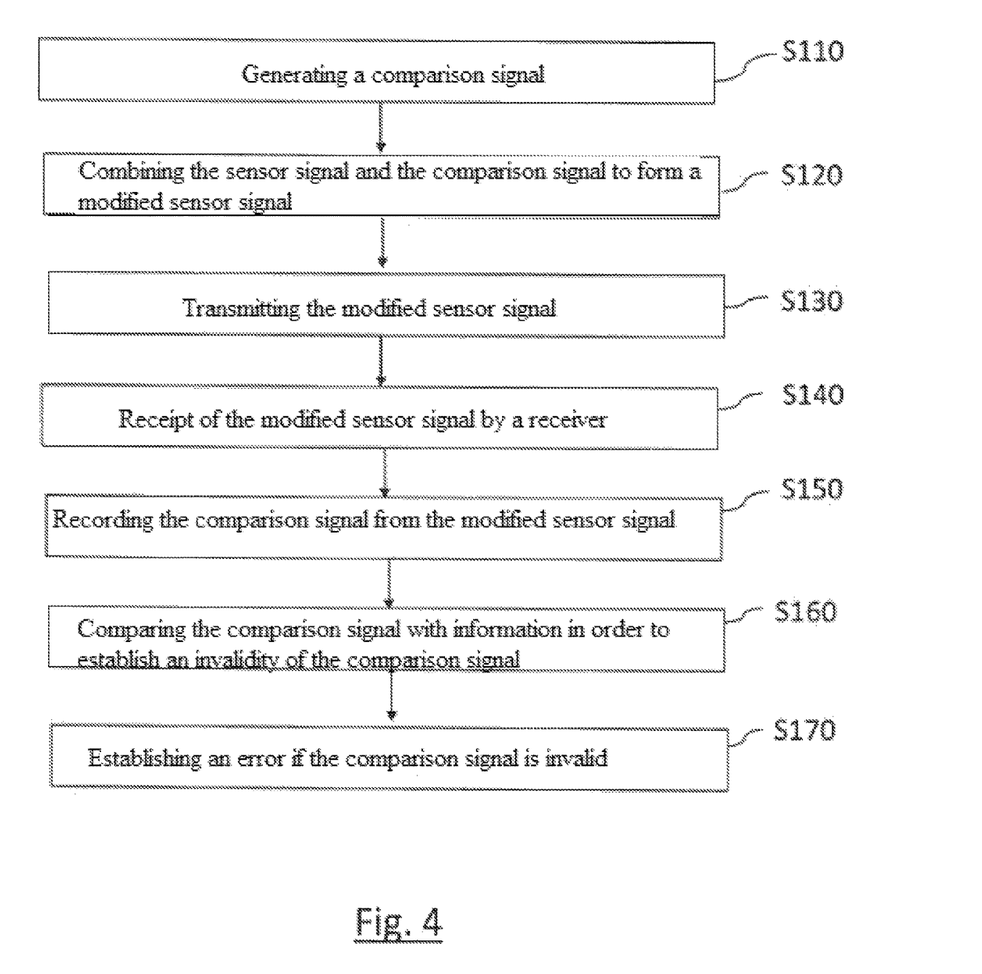
FIG. 4 shows a flow chart of a method for securely transmitting a sensor signal.

FIG. 4 shows a flow chart for a method for securely transmitting a sensor signal 105 relating to a physical variable according to the present invention.

The method comprises the steps: generating S110 a comparison signal 125, which changes over time in a predetermined manner over a range of values; combining S120 the sensor signal 105 and the comparison signal 125 to form a modified sensor signal 135; transmitting S130 the modified sensor signal 135 over a signal path 150; receiving S140 the modified sensor signal 135 by a receiver; recording S150 the comparison signal 225 from the modified sensor signal; comparing S160 the recorded comparison signal 225 with information about a valid comparison signal 125 in order to establish an invalidity of the recorded comparison signal 225 on the basis of a comparison of the information about the recorded comparison signal 225; and establishing S170 an error in the transmission of the sensor signal 105 if the recorded comparison signal 225 is invalid. The error can optionally be signaled to a user.

The method can likewise be implemented on a computer, i.e. it can be implemented by instructions which are stored on a storage medium and are capable of executing the steps of the method if it runs on a processor. The program software code/instructions which belong to the flow chart typically include one or more instructions which are stored in different ways on different media in or peripheral to a control unit (with a processor) which, if read and executed by the control unit, permit the control unit to execute functions, functionalities and operations necessary for carrying out a method.

When an error is established, this occurrence can be communicated to a user. Alternatively, or additionally, however, it is likewise possible that the one-off occurrence of an error leads merely to renewed transmission of the sensor signal 105, i.e. the physical variable is detected and transmitted once again. Only if the error still exists can this lead to an error message, with the result that the user can draw suitable conclusions from this.

Different aspects of the present invention can also be summarized as follows:

The basic inventive concept is based on a skillful division of monitoring between a sensor unit (with the transmission device 100) and a central control unit/actuator control unit (with the receiving device 200) as well as a measurement of an addition, self-generated signal (comparison signal 125) with a known path. It thus becomes possible to design the sensor element with only one microcontroller to be able to "fail silent". With two sensor elements, further conceivable errors can be recognized securely by a suitable choice of signal path.

This helps save on a microcontroller, and the hardware costs are reduced. Additionally, the energy requirement, as well as installation space and board space, are reduced, which in turn leads to reduced production and operating costs.

According to the present invention, the sensor unit contains one or two sensors with an analog output signal (sensor signal 105) and a known signal (comparison signal 125) which for example can have a sawtooth shape, a sinusoidal shape or a PT1 signal and which changes periodically over the whole signal range of the sensors 101. The signal range and the period are known to the sensor apparatus and/or the central control unit/actuator control unit.

Advantageously, the period and the sampling rate are chosen such that the change in sampling is so small, with the result that the fewest possible values of the analog-digital converter lie between samplings. With a free-running periodic signal it is guaranteed, by asynchronism, that all analog-digital values occur over a specific time even if the sampling frequency is chosen such that the value changes by more than one increment between samplings. It can thus be checked whether the calculation was carried out correctly with all possible analog-digital values.

In another embodiment, the period can be determined by the microcontroller (data processing unit 130) of the sensor control unit (transmission device 100). The control signal 118 can be used for this purpose.

The signals can be digitized by the microcontroller via an analog-digital converter (analog-digital converter 117) with an upstream multiplexer 113. As the known periodic signal 125 periodically goes through the entire input range, it is possible to check the analog-digital converter 117 for errors (linearity, absolute value, erroneous code, etc.).

The digitized values can be transmitted via the interface 140 to the central control unit/actuator control unit 200 for further processing. Optionally, the digitized values can be processed to form a physical value (e.g. a path of a pedal) also in the microcontroller. Subsequently, this value can then be transmitted to the central control unit/actuator control unit via the interface. During processing, an offset correction, a linearization, a calibration with calibration data or other processing steps can additionally take place.

For checking/calculation in the central control unit/actuator control unit 200, in further embodiments, for example in an EOL (end of line) test, after changing the sensor unit or the like, on request the calibration data can be transmitted when switching on, or regularly to the central control unit/actuator control unit 200. If, for reasons of security, the calibration data are stored several times in the sensor control unit, all stored calibration data or only the checked calibration data can be transmitted. Additionally, a non-volatile storage of the calibration data can take place in the central control unit/actuator control unit 200. A change in the calibration values can thus be checked. A conclusion about an error or an exchange in sensor unit can be drawn from the change in calibration values.

The sensor signal 105 and the periodic signal 125 can be processed with the same algorithm as the calculation of one of the sensor values. It can thus be guaranteed that the calculation is carried out correctly over the whole input range (as the path of the periodic signal 125 is known).

The two sensor signals 105a, 105b can be calculated by different software portions. Different implementations can thus be possible. For example, the algorithm can be identical, but the machine code is different due to differently chosen compiler settings. It is likewise possible that the algorithm is identical but the implementation is different. It is likewise possible that the algorithm is different. One possibility for different algorithms may be due to a calculation by a function and a calculation by a look-up table. A further possibility is the use of different functions.

When using different algorithms or functions, in addition to hardware errors, compiler errors and programming errors can be recognized in the controller.

Common mode errors of the analog values are checked in further embodiments. This can for example take place due to the fact that their signals 105a, 105b are contradirectional, i.e. a change in the variable to be measured changes the signal of the two sensors in opposite directions. It is thus possible to recognize a falsification of both sensor values in the same direction, as an error acting on both signals in the same direction leads to a non-plausible sum signal.

A connection of sensor 105 to microcontroller 130 is checked in further embodiments. For example, this can be achieved by the sensors 105 being configured such that an invalid value is generated upon a short-circuit of the signal (e.g. due to different impedances or different voltage/current ranges of the sensors).

Moreover, the short-circuit of the sensor signals can be checked periodically by each sensor signal being changed with a defined signal. In this test, only one sensor signal may change. If both sensor signals change, a short-circuit occurs.

In further embodiments, the transmission to the control unit/actuator unit takes place as follows. The data are transmitted via a digital interface 140. The data can be secured by a checksum and a message counter. For example, the following are transmitted: sensor signal 105a, sensor signal 105b, known signal (comparison signal 125), message counter, checksum (e.g. CRC).

In further embodiments, the checking in the control unit/actuator unit 200 takes place as follows. For example, the following functions are executed in the control unit/actuator 200: checking the message counter, checking the checksum and checking the periodic signal (comparison signal 125) with the expected path. During interference in transmission (missing data, delayed data), the message counter can be used to restrict the monitoring range.

The known signal (comparison signal 125) guarantees that the values change continuously on the interface. A checking of the processing in the sensor unit and the transmission unit is thus guaranteed.

The features of the invention disclosed in the description, the claims and the Figures can be essential to the implementation of the invention, both individually and also in any combination.

The list of the reference signs is as follows:
100 Transmission device
101 Actuator
102 Sensor(s)
105 Sensor signal(s)
110 Input interface
113 Multiplexer
117 Analog-digital converter
118 Control signal
119 Digital signal
120 Signal generator
125 Comparison signal
130 Data processing unit
131 First algorithm
132 Second algorithm
133 Third algorithm
134 Combiner
135 Modified sensor signal
140 Output interface
150 Signal path
160 First time base
170 Monitoring unit
180 Second time base
190 Feedback
200 Receiving device
210 Input interface
220 Recording unit
225 Recorded comparison signal
230 Evaluation unit
235 Error signal
240 Error detector

The invention claimed is:

1. A transmission device for transmitting a sensor signal relating to a physical variable, comprising:
an input interface for inputting the sensor signal;
a signal generator for generating a comparison signal;
a data processing unit to combine the sensor signal and the comparison signal to form a modified sensor signal; and
an output interface which can be coupled to a signal path to output the modified sensor signal;
wherein the comparison signal changes over time in a predetermined manner over a range of values,
wherein the sensor signal includes a first sensor signal and a second sensor signal, both of which record the physical variable and are contradirectional, with the result that a change in physical variable leads to opposite effects on the first sensor signal and on the second sensor signal, and wherein the data processing unit is configured to process the first sensor signal and the second sensor signal and the comparison signal and combine them to form the modified sensor signal, and
wherein the first sensor signal takes values in a first sensor range and the second sensor signal takes values in a second sensor range, wherein an averaging of values of the first sensor range with values of the second sensor range leads to average values which lie outside the first sensor range and outside the second sensor range, and the data processing unit is configured to detect the average values as invalid sensor values and to output an error.

2. The transmission device of claim 1, wherein, depending on the physical variable, the sensor signal takes values in a sensor range, and the signal generator is configured to generate the comparison signal such that the range of values includes the sensor range.

3. The transmission device of claim 1, further comprising:
an analog-digital converter to convert the sensor signal and the comparison signal into a digital signal in the same way, wherein the output interface is a digital interface, to emit the digital signal.

4. The transmission device of claim 3, wherein the signal generator is configured to generate the comparison signal periodically over time with a predetermined period, and wherein a sampling rate of the analog-digital converter and/or the period are chosen such that successive samplings of the comparison signal differ by not more than a predetermined number of digitization steps.

5. The transmission device of claim 4, wherein the data processing unit is configured to control the period of the comparison signal via a control signal.

6. The transmission device of claim 1, further comprising:
a multiplexer to combine the sensor signal and the comparison signal, and to output a combined signal to the analog-digital converter.

7. A transmission device for transmitting a sensor signal relating to a physical variable, comprising:
an input interface for inputting the sensor signal;
a signal generator for generating a comparison signal;
a data processing unit to combine the sensor signal and the comparison signal to form a modified sensor signal; and
an output interface which can be coupled to a signal path to output the modified sensor signal;
wherein the comparison signal changes over time in a predetermined manner over a range of values,
wherein the sensor signal includes a first sensor signal and a second sensor signal, both of which record the physical variable and are contradirectional, with the result that a change in physical variable leads to opposite effects on the first sensor signal and on the second sensor signal, and wherein the data processing unit is configured to process the first sensor signal and the second sensor signal and the comparison signal and combine them to form the modified sensor signal, and
wherein there is a feedback from the data processing unit to an input of the first sensor signal and the second sensor signal to change one of the first sensor signal and the second sensor signal by a predetermined value, and wherein the data processing unit is configured to ascertain an error if both sensor signals change in response to the change of one of the two sensor signals.

8. The transmission device of claim 1, wherein the data processing unit is configured to process the first sensor signal with a first algorithm and process second sensor signal with a second algorithm and process the comparison signal with a third algorithm, wherein the first algorithm and the second algorithm and the third algorithm are the same or the second algorithm is different from the first and third algorithms, wherein, if the first to third algorithms are the same, the second algorithm has a different machine code from the first and third algorithms, or the same algorithm for the second sensor signal is implemented differently compared with the first sensor signal and with the comparison signal.

9. The transmission device of claim 1, wherein the data processing unit is further configured to generate a message counter and/or a checksum and add it to the modified sensor signal, wherein the message counter and/or the checksum are configured to detect and/or locate an error during transmission on the signal path.

10. The transmission device of claim 1, wherein the data processing unit is configured to carry out an offset correction and/or a linearization and/or a calibration of the sensor signal and to store the calibration data at least once.

11. The transmission device of claim 1, wherein the data processing unit is couple-able to a first time base and includes a monitoring unit which is couple-able to a second time base, wherein the monitoring unit is configured to ascertain an error as a result of an erroneous time base, for which reason the second time base can be used, and to output a corresponding error message.

12. The transmission device of claim 1, which is configured to receive the first sensor signal from a first sensor and the second sensor signal from a second sensor, wherein the first sensor and the second sensor detect a state of a vehicle component.

13. A receiving device for receiving a modified sensor signal from a transmission device, comprising:
an input interface which is couple-able to the signal path to receive the modified sensor signal;
a detection unit for detecting a comparison signal;
an evaluation unit for evaluating the comparison signal, wherein the evaluation unit has access to information about a valid comparison signal to ascertain an invalidity of the comparison signal based on a comparison of the information about the recorded comparison signal; and
an error detector to detect an error if the comparison signal is invalid;
wherein the transmission device is for transmitting a sensor signal relating to a physical variable, and the transmission device includes:
an input interface for inputting the sensor signal;
a signal generator for generating the comparison signal;
a data processing unit to combine the sensor signal and the comparison signal to form the modified sensor signal; and
an output interface which is couple-able to a signal path to output the modified sensor signal, wherein the comparison signal changes over time in a predetermined manner over a range of values;
wherein the sensor signal includes a first sensor signal and a second sensor signal, both of which record the physical variable and are contradirectional, with the result that a change in physical variable leads to opposite effects on the first sensor signal and on the second sensor signal, and wherein the evaluation unit is configured to process the first sensor signal and the second sensor signal and the comparison signal and combine them to form the modified sensor signal, and
wherein the first sensor signal takes values in a first sensor range and the second sensor signal takes values in a second sensor range, wherein an averaging of values of the first sensor range with values of the second sensor range leads to average values which lie outside the first sensor range and outside the second sensor range, and the evaluation unit is configured to detect the average values as invalid sensor values and to output an error.

14. The receiving device of claim 13, further comprising:
a device for requesting calibration values which is configured to request calibration values from the transmission device or a memory to ascertain a value of the physical variable from the sensor signal.

15. The receiving device of claim 13, wherein the detection unit is configured to extract the checksum and/or the message counter from the modified sensor signal, and the evaluation unit is configured to ascertain interferences on the signal path from variations in the checksum and/or the message counter and to ascertain erroneous sections in the modified sensor signal by the message counter.

16. The receiving device of claim 13, wherein the evaluation unit is configured to receive and store a form of the valid comparison signal from the transmission device.

17. A vehicle, comprising:
an actuator;
a sensor for recording a position of the actuator; and a system, wherein the sensor is configured to record a position of the actuator as a sensor signal, and the system is configured to transmit the sensor signal securely to an electronic control unit;
wherein the system includes:
a transmission device for transmitting a sensor signal relating to a physical variable, including:
an input interface for inputting the sensor signal;
a signal generator for generating a comparison signal;

a data processing unit to combine the sensor signal and the comparison signal to form a modified sensor signal; and an output interface which can be coupled to a signal path to output the modified sensor signal, wherein the comparison signal changes over time in a predetermined manner over a range of values;

a receiving device for receiving a modified sensor signal from a transmission device, including:

an input interface which is couple-able to the signal path to receive the modified sensor signal;

a detection unit for detecting the comparison signal;

an evaluation unit for evaluating the comparison signal, wherein the evaluation unit has access to information about a valid comparison signal to ascertain an invalidity of the comparison signal based on a comparison of the information about the recorded comparison signal; and an error detector to detect an error if the comparison signal is invalid; and a signal path connecting the transmission device to the receiving device;

wherein the sensor signal includes a first sensor signal and a second sensor signal, both of which record the physical variable and are contradirectional, with the result that a change in physical variable leads to opposite effects on the first sensor signal and on the second sensor signal, and wherein the electronic control unit is configured to process the first sensor signal and the second sensor signal and the comparison signal and combine them to form the modified sensor signal, and wherein the first sensor signal takes values in a first sensor range and the second sensor signal takes values in a second sensor range, wherein an averaging of values of the first sensor range with values of the second sensor range leads to average values which lie outside the first sensor range and outside the second sensor range, and the electronic control unit is configured to detect the average values as invalid sensor values and to output an error.

18. A method for securely transmitting a sensor signal relating to a physical variable of an actuator of a vehicle, the method comprising:

generating, via a signal generator, a comparison signal which changes over time in a predetermined manner over a range of values;

combining, via a data processing unit, the sensor signal and the comparison signal to form a modified sensor signal;

transmitting, via a transmission device, the modified sensor signal over a signal path connecting the transmission device to a receiving device;

receiving, via the receiving device, the modified sensor signal by a receiver;

extracting the comparison signal from the modified sensor signal;

comparing, via an evaluation unit, the extracted comparison signal with information about a valid comparison signal to ascertain an invalidity of the recorded comparison signal based on a comparison of the information about the extracted comparison signal; and ascertaining, via the evaluation unit, an error in the transmission of the sensor signal if the recorded comparison signal is invalid;

wherein the sensor signal includes a first sensor signal and a second sensor signal, both of which record the physical variable and are contradirectional, with the result that a change in physical variable leads to opposite effects on the first sensor signal and on the second sensor signal, and wherein the processor is configured to process the first sensor signal and the second sensor signal and the comparison signal and combine them to form the modified sensor signal, and wherein the first sensor signal takes values in a first sensor range and the second sensor signal takes values in a second sensor range, wherein an averaging of values of the first sensor range with values of the second sensor range leads to average values which lie outside the first sensor range and outside the second sensor range, and the processor is configured to detect the average values as invalid sensor values and to output an error.

19. A non-transitory computer readable medium having a computer program, which is executable by a processor, comprising:

a program code arrangement having program code for securely transmitting a sensor signal relating to a physical variable, the by performing the following:

generating a comparison signal which changes over time in a predetermined manner over a range of values;

combining the sensor signal and the comparison signal to form a modified sensor signal;

transmitting the modified sensor signal over a signal path;

receiving the modified sensor signal by a receiver;

extracting the comparison signal from the modified sensor signal;

comparing the extracted comparison signal with information about a valid comparison signal to ascertain an invalidity of the recorded comparison signal based on a comparison of the information about the extracted comparison signal; and ascertaining an error in the transmission of the sensor signal if the recorded comparison signal is invalids wherein the sensor signal includes a first sensor signal and a second sensor signal both of which record the physical variable and are contradirectional with the result that a change in physical variable leads to opposite effects on the first sensor signal and on the second sensor signal and wherein the processor is configured to process the first sensor signal and the second sensor signal and the comparison signal and combine them to form the modified sensor signal and wherein the first sensor signal takes values in a first sensor range and the second sensor signal takes values in a second sensor range, wherein an averaging of values of the first sensor range with values of the second sensor range leads to average values which lie outside the first sensor range and outside the second sensor range, and the processor is configured to detect the average values as invalid sensor values and to output an error.

* * * * *